US008385910B2

(12) United States Patent
Nazrul et al.

(10) Patent No.: US 8,385,910 B2
(45) Date of Patent: Feb. 26, 2013

(54) SYSTEMS AND METHODS FOR TESTING SIGNAL PROCESSING CONTROL

(75) Inventors: Shahbaz Nazrul, Poway, CA (US);
Suhas A. Pai, San Diego, CA (US);
Zhilin Liu, San Diego, CA (US); Amit Gil, San Diego, CA (US); Daehak Kim, San Diego, CA (US); Gopal Agarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1584 days.

(21) Appl. No.: 10/851,971

(22) Filed: May 20, 2004

(65) Prior Publication Data

US 2005/0260962 A1  Nov. 24, 2005

(51) Int. Cl.
*H04W 24/00* (2009.01)
(52) U.S. Cl. .................. 455/425; 455/115.1
(58) Field of Classification Search .......... 455/425, 455/423, 57.14, 57.11, 115.2, 115.1, 67.11–67.7; 375/224–228
See application file for complete search history.

(56) References Cited

U.S. PATENT DOCUMENTS

| 5,425,076 | A  | * | 6/1995  | Knippelmier | 455/67.14 |
|-----------|----|---|---------|-------------|-----------|
| 5,933,776 | A  | * | 8/1999  | Kirkpatrick | 455/67.11 |
| 6,839,544 | B1 | * | 1/2005  | Johnson     | 455/67.11 |
| 6,940,263 | B2 | * | 9/2005  | Henriksson  | 324/76.19 |
| 7,203,476 | B2 | * | 4/2007  | Ruelke et al. | 455/324 |
| 2004/0203467 | A1 | * | 10/2004 | Liu et al. | 455/67.14 |
| 2005/0070268 | A1 | * | 3/2005  | Hakkinen et al. | 455/423 |
| 2006/0094365 | A1 | * | 5/2006  | Inogai et al. | 455/67.11 |
| 2008/0144750 | A1 | * | 6/2008  | Peeters et al. | 375/346 |

* cited by examiner

*Primary Examiner* — Lana N Le
(74) *Attorney, Agent, or Firm* — Nicholas J. Pauley; Won Tae Kim

(57) ABSTRACT

A test system emulates the analog processing portion of a communication device and adjusts input signals based on distortions specified by a user and control signals generated by a baseband processing portion of the communication device. The distortions can be specified in terms of the baseband. One or more of the control signals can be bypassed to investigate the effect of each of the control signals alone, or in various combinations. An operator interface can be provided that allows the user to set up and conduct the tests, and monitor the results. Facilities are also provided to allow the reference voltage at the baseband processing portion to be adjusted while maintaining the appropriate reference voltage for components in the test system.

49 Claims, 10 Drawing Sheets

SYSTEMS AND METHODS FOR TESTING SIGNAL PROCESSING CONTROL

BACKGROUND

Code division multiple access (CDMA) communication technology can present many engineering design and verification challenges, due to complexities that can arise when integrating radio frequency (RF) and baseband designs to achieve a working system. Optimizing the design for a device incorporating CDMA technology can therefore be a process of compromise. The smallest and largest signals define the dynamic range of the receiver system. Noise limits the smallest signals that a receiver system is capable of processing. The largest signal is limited by distortions arising from nonlinearity of receiver circuits. Large interfering signals also hinder the reception of small desired signals. The nonlinearities in the receiver networks generate distortion products that fall within the receiver passband. These distortion products prohibit or reduce message reliability. An optimal noise design typically yields less than optimal large signal performance. The best large signal performance suffers from higher noise degradation, which in turn limits the weak signal reception. The error sources determine the bit error rate related to a particular transmitting power.

In addition to noise, a frequency error also significantly contributes to the bit error rate. Frequency error is caused by different oscillator frequencies at the transmitting and receiving portion of a communication device. The mismatch between the oscillator frequencies at the transmitting end and at the receiving end can be caused by manufacturing tolerances in the oscillators and oscillating crystals used.

In addition, the Doppler effect contributes to the frequency error. Relative movement between the transmitter and the receiver leads to a frequency shift in the signals transmitted.

A homodyne, direct conversion receiver, also referred to as a zero intermediate frequency (ZIF) receiver, translates a desired radio frequency (RF) frequency directly to baseband to recover information. Baseband is the range of frequencies occupied by the signal before modulation or after demodulation. The baseband frequencies are typically substantially below the RF frequencies. At low baseband frequencies, signals may approach or include direct current (DC). The upper frequency limit of baseband depends on the data rate, or speed, at which information is sent.

A performance parameter referred to as the second order intercept point (IP2) reflects a system's susceptibility to second-order distortion. The higher the value of input IP2, the higher a system's immunity to second-order interference for the targeted baseband signal. The IP2 is a key indicator of the receiver's behavior in the presence of a very strong amplitude modulated (AM) jammer signal relative to the receive signal. When IP2 is too low, an off-channel jammer signal will interfere with the receiver's operation because second order distortion will lead to an unwanted baseband signal, which will interfere with the desired baseband information.

DC offset has also presented a serious design challenge to ZIF receiver design. Ideally, only undistorted information results from down-converting an RF signal to baseband. The circuit mismatch inherent in both RF and baseband analog circuits typically introduces a DC error, however, which is then added to the baseband signal. This offset error can be affected by both temperature and time.

Unlike heterodyne designs, ZIF receivers also place severe restrictions on local oscillator (LO) leakage and reradiation. Since both the LO and RF receive channels operate on the same frequency, any LO reverse leakage from the mixer will travel backwards to the antenna from where it is radiated into the RF passband, causing potential interference to other spectrum users.

As improvements in wireless communications are continuously being sought, specifications are often still evolving when the design cycle starts. The system design engineer must be able to perform system tradeoffs, define RF analog and digital baseband subsystem requirements, and ensure that the design will work when it is finally put together. This can be a difficult design and verification challenge, particularly when RF analog and digital baseband engineers can be two different design groups. In addition, it is often important for RF analog and baseband designs to progress in parallel for faster time-to-market, making system performance interactions and potential problems between RF analog and baseband sections more difficult to verify and fix until prototype designs are completed and tested together. This highlights the need to provide design and verification capability that allows performance tradeoffs to be examined for RF and baseband sections separately, as well as together.

SUMMARY

A test system emulates the analog processing portion of a communication device. Input signals are adjusted based on distortions specified by a user and control signals generated by a baseband processing portion of the communication device to correct the distortions. The distortions can be specified in terms of the baseband. One or more of the control signals can be bypassed to investigate the effect of each of the control signals alone, or in various combinations. An operator interface can be provided that allows the user to set up and conduct the tests, and monitor the test results. Facilities are also provided to allow the reference voltage at the baseband processing portion to be adjusted while maintaining the appropriate reference voltage for components in the test system.

In some embodiments, a system for testing a mobile station modem (MSM) includes a radio frequency (RF) receiver model couplable to communicate with the MSM. The RF receiver model can receive input signals representing radio frequency (RF) signals, test parameters from an operator interface, and control signals from the MSM. The input signals can be adjusted based on the control signals and the test parameters, and provided back to the MSM.

In other embodiments, a system for a communication device that can include an analog signal processing portion and a MSM is disclosed. The MSM generates control signals that are provided to the analog signal processing portion. A RF receiver model in the system includes receiver components that emulate the analog signal processing portion of the communication device. The RF receiver model also includes signal compensation components that receive the control signals, combine the control signals with distortion signals to form adjusted error signals, and apply the adjusted error signals to an input signal being processed by the receiver components.

These and other embodiments will be understood upon an understanding of the present disclosure by one of ordinary skill in the art to which it pertains.

BRIEF DESCRIPTION OF THE DRAWINGS

The accompanying drawings, which are incorporated in and form a part of this specification, illustrate embodiments of the invention and, together with the description, serve to explain its principles.

DETAILED DESCRIPTION

Figure 1:
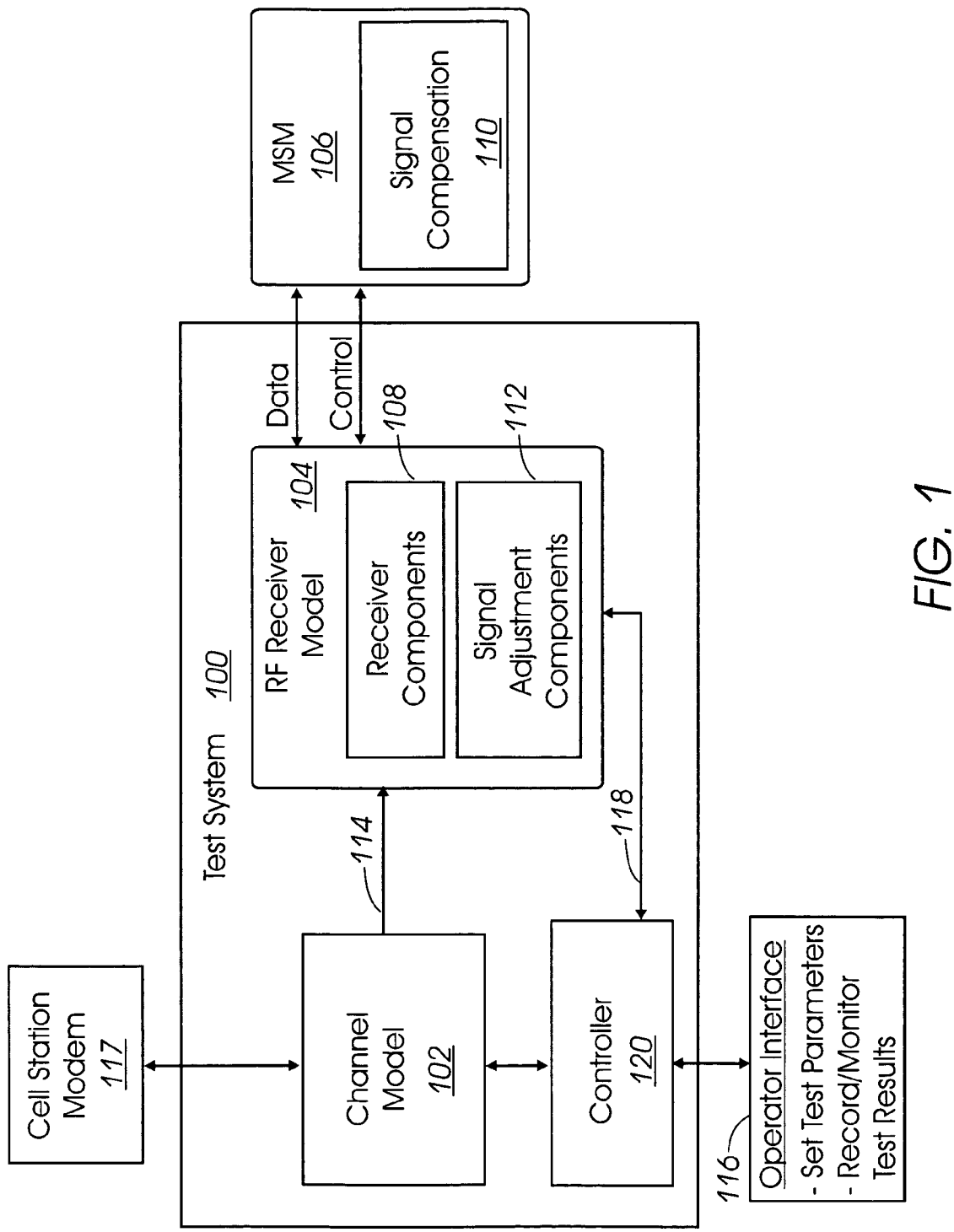
FIG. 1 is a diagram of an embodiment of a system for testing a mobile station modem (MSM) of a communication device.

Referring to FIG. 1, an embodiment of a test system 100 is shown that allows a designer to vary parameters in a channel model 102 and a radio frequency (RF) receiver model 104 to test the performance of a mobile station modem (MSM) 106. The test system 100 can be used to design mobile station modems 106 for various types of wireless communication devices such as cellular telephones, portable digital assistants, and portable computers. The RF receiver model 104 can be configured to include actual and/or simulated receiver components 108 that process signals from the channel model 102, and output the processed signals in the format expected by the MSM 106. The MSM 106 can include a signal compensation circuit 110 that generates control signals to adjust signal processing parameters in the receiver components 108. The adjustments are typically made to improve the signal to noise ratio for the received signals before the signals are provided to the MSM 106. Signal adjustment components 112 can be included in the RF receiver model 104 to allow an operator to introduce effects such as distortion and noise to digital input signals 114 via an operator interface 116.

Figure 2:
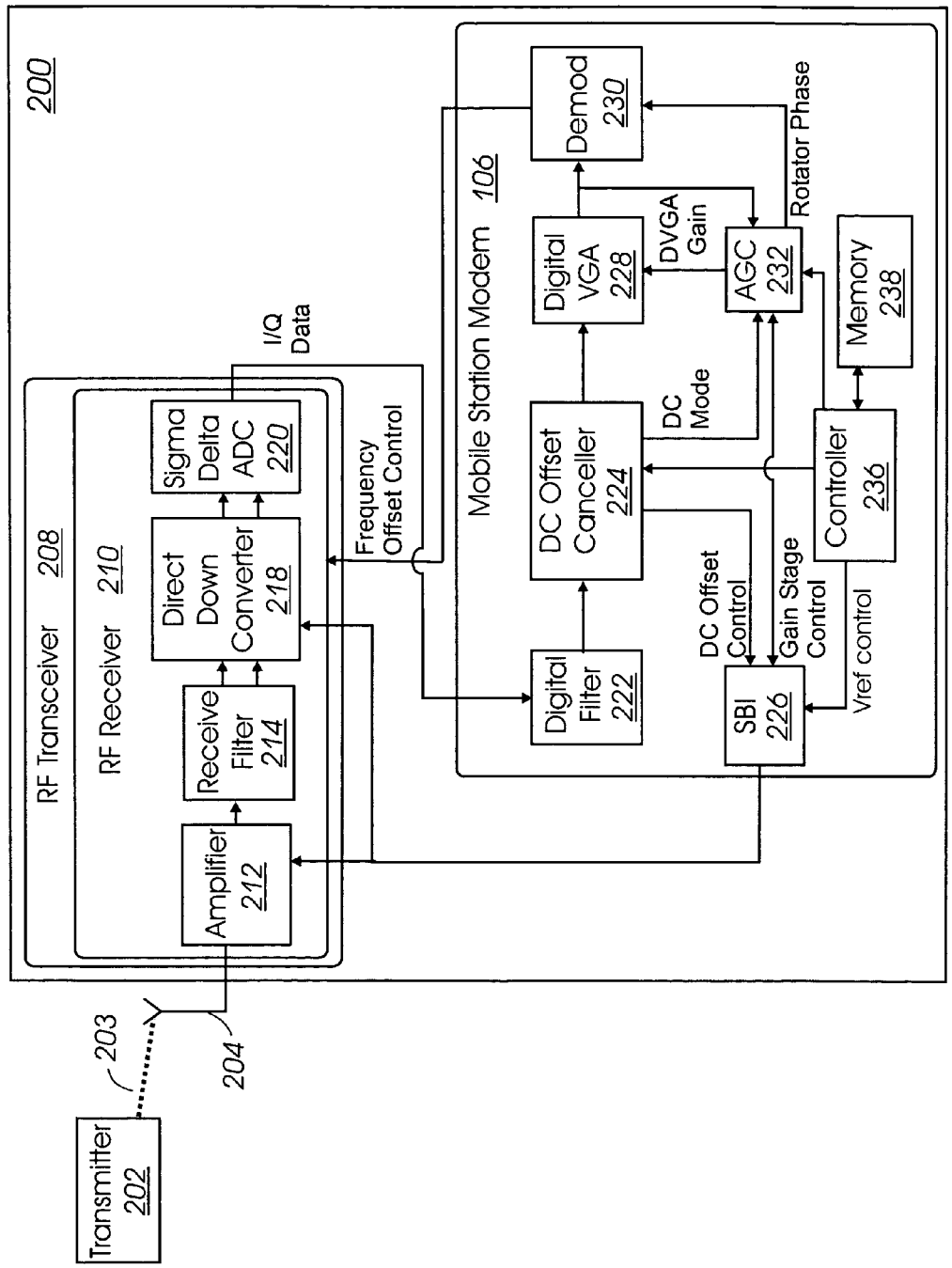
FIG. 2 is a diagram of an example of a communication device including the MSM that can be tested using the test system shown in FIG. 1.

Referring to FIGS. 1 and 2, FIG. 2 shows an embodiment of a wireless communication device 200 that can be tested using the test system 100. In the real world, a transmitter 202 (e.g., a base stations, a GPS satellite, a broadcast station, and so on) transmits RF signals 203 to the wireless communication device 200. RF signals 203 can also be communicated directly between two or more wireless communication devices 200. The wireless communications device 200 includes an antenna 204 for receiving and transmitting the RF signals 203, and a RF transceiver 208 for processing the signals transmitted and received by the antenna 204. The RF transceiver 208 typically includes a RF receiver 210 and a transmitter (not shown). The RF receiver components 108 in test system 100 can be configured to replicate the signal processing functions performed by the RF receiver 210. The wireless communications device 200 typically also includes the MSM 106, and can also include a user input device, such as a microphone, and a user output device, such as a speaker.

The RF signals 203 can be distorted in different ways, for example, by noise, multipath gain, delay, and fading. The effects may vary with respect to one or more variables such as weather and atmospheric effects, terrain features, and distance from the transmitter 202. The channel model 102 can simulate the real-world effects of noise, gain, delay, and fading on the digital input signals 114 provided by the cell station modem 117 before the signals are input to the RF receiver model 104. The ability to vary the quality of the digital input signals 114 and other design parameters for the RF receiver model 104 enables designers to control the test environment and evaluate the performance of the MSM 106 under various conditions.

The operator interface 116 allows a user to set distortion parameters to model real-world effects on the digital input signals 114, vary signal adjustment components 112 for individual tests, as well as to set up a series of tests to run automatically. Other suitable functionality can be implemented to enable the user to interface with the RF receiver model 104, the channel model 102, and the MSM 106. Facilities for recording and monitoring the test results can also be accessed through the operator interface 116. The operator interface 116 can include suitable features for data input and output, such as a display, a keyboard, a mouse, a light pen or other data input device, recording media, printers, and plotters. A suitable data communication interface, such as a serial bus 118, can be included to transfer signals between the RF receiver model 104 and the operator interface 116 via a controller card 120, which provides a communication interface from the operator interface 116 to the channel model and the RF receiver model 104.

In FIG. 2, RF signals 203 transmitted from one or more transmitters 202 are received by one or more antennas 204 and provided to an amplifier 212. Amplifier 212 amplifies the received signal with a particular gain to provide an amplified RF signal. Amplifier 212 may comprise one or more low noise amplifier (LNA) stages designed to provide a particular range of gains and/or attenuation. The specific gain of amplifier 212 may be determined by components in the MSM 106 and provided to the amplifier 212 via a serial bus interface (SBI) circuit 226. The amplified RF signal is then filtered by a receive filter 214 to remove noise and spurious signals. The filtered RF signal is provided to a direct downconverter 218.

Direct downconverter 218 can perform direct quadrature downconversion of the filtered RF signal from RF to baseband. This may be achieved by multiplying (or mixing) the filtered RF signal with a complex local oscillator (LO) signal to provide a complex baseband signal. In particular, the filtered RF signal may be mixed with an in-phase LO signal to provide an in-phase (I) baseband component and mixed with a quadrature LO signal to provide a quadrature (Q) baseband component.

The I/Q signals are provided to an analog-to-digital converter (ADC) 220. The ADC 220 digitizes the I/Q signals to provide I/Q samples to the MSM 106. The ADC 220 may be implemented with various ADC designs, such as with sigma-delta modulators capable of filtering and then over-sampling the I/Q baseband signals at multiple times the chip rate of the baseband components. The over-sampling allows the ADC 220 to provide a higher dynamic range and further allows the I/Q samples to be provided with fewer number of bits for a given precision. The I/Q samples can be provided from the ADC 220 to a digital filter 222 in the MSM 106.

The digital filter 222 filters the I/Q samples and may perform any number of functions such as image rejection filtering, baseband pulse-matched filtering, decimation, sample rate conversion, and so on.

A DC offset canceller 224 analyzes the I/Q samples from the digital filter 222 and generates control signals that are sent to the RF receiver 210 to attempt to remove DC offset errors in the RF input signal during processing in the RF receiver 210. The DC offset canceller 224 can implement one or more DC offset correction feedback loops that attempt to remove DC offsets at different locations in the received signal path, as further described in U.S. patent application Ser. No. 10/139,205 entitled "Direct Current Offset Cancellation For Mobile Station Modems Using Direct Conversion", filed May 2, 2002.

A digital variable gain amplifier (DVGA) 228 digitally amplifies the I/Q samples to provide I/Q data for subsequent processing by a digital demodulator 230. Digital demodulator 230 demodulates the I/Q data to provide demodulated data, which may then be provided to a subsequent decoder (not shown). Digital filter 222, DC offset canceller 224, DVGA 228, and digital demodulator 230 may be implemented within one or more integrated circuits (ICs), e.g., within a single digital signal processor.

An automatic gain control (AGC) circuit 232 can receive the I/Q data output by the DVGA 228 and a DC mode signal from DC offset canceller 224, and provide the signals to control variable gain elements in the amplifier 212. In some embodiments, gain stage control signals can be provided to the amplifier 212 and the direct downconverter 218 via the SBI circuit 226. Information regarding the gain can also be provided to the DVGA 228. The AGC circuit 232 can provide the appropriate gain control signals for the components in the RF receiver 210 and the DVGA 228 such that the desired amplitude for the RF signal is achieved.

A controller 236 can direct various operations of the communication device 200. For example, the controller 236 may direct the operation of various components such as the DC offset canceller 224, the AGC circuit 232, the DVGA 228, and/or the SBI circuit 226. A memory 238 can provide storage for data and program codes for the controller 236.

The processing of the RF signal may be performed by one or more stages of the amplifier 212, filter 214, and downconverter 218. For example, the RF signal may be amplified by one or more amplifier stages. Also, filtering may be provided before and/or after the amplifier stages, and is also typically performed after the frequency downconversion. For simplicity, these various signal conditioning stages are included together into the blocks shown in FIG. 2. Test system 100 can also be configured to emulate other configurations of RF receiver 210.

The topology of the direct downconversion RF receiver 210 reduces the number of required components, receiver complexity, and cost compared to other receiver architectures. Performance may be limited in a direct downconversion architecture in several ways, however. For example, the direct downconverter 218 includes the local oscillator (LO) that can generate a signal tuned to the same frequency as the desired RF signal that is injected into the mixer. The RF and LO signals mix to produce the baseband frequency. When translating directly from RF to baseband, a DC component (along with a bandlimited information signal) is realized at the output of the mixer. The DC component (or DC-offset) can interfere with detecting the desired information signal.

Significant offsets in the RF or LO frequencies degrade bit error rate, therefore direct downconversion receiver limitations require tighter frequency centering of the LO and RF frequencies. When the desired signal is above the very high frequency (VHF) range, the direct downconversion design becomes more complex, partially due to the frequency offset problems. One solution to prevent the centering problem in higher frequency zero-IF receivers is to add an automatic frequency control (AFC) circuit (not shown) that automatically adjusts the frequency of the LO.

The amplifier 212 increases the amplitude of weak signals, thereby allowing further processing by the receiver 210. An ideal amplifier increases the amplitude of the desired signal without adding distortion or noise. Unfortunately, the amplifier 212 typically adds noise and distortion to the desired signal. Increasing gain from the amplifier 212 typically improves the system noise, however. On the other hand, too large of an increase in the amplifier gain causes the receive filter(s) 214 to compress some large undesired signals. Once the signals are compressed, filter rejection is reduced, thus limiting protection. As a result, the automatic gain control (AGC) circuit 232 can automatically adjust the gain of the amplifier 212 to protect against large signal interference.

The amplifier 212 is typically constructed from active devices that are operated in the "linear range." Even though the active devices operate in their linear range, the output signal is not perfectly linear. Thus, distortion is added to the amplified signal by nonlinearities of the transistor. Gain compression, harmonic distortion, cross-modulation, and intermodulation distortion directly result from amplifier nonlinearity. The components of the MSM 106 are configured to generate control signals to help correct the above-mentioned distortions to the received signal.

Two or more antennas 204 can be configured to take advantage of the different paths of a wave propagating in a reflective environment in order to improve overall system performance. Such techniques are referred to as antenna diversity. Different kinds of diversity, such as spatial diversity and beam diversity, can be implemented. Saturation refers to the point at which the output of a linear device, such as linear amplifier 212, deviates significantly from being a linear function of the input when the input signal is increased. Modulation of a signal often requires that amplifier 212 operates below saturation. Further details regarding antenna diversity techniques are not provided herein as they are not considered to be part of the invention. Test system 100 can be configured, however, to display information regarding antenna diversity and saturation, as further described herein.

Referring now to FIGS. 1, and 3 through 9, embodiments of operator interface display 300 that allows the user to set and monitor test parameters for the RF receiver model 104 and the MSM 106 are shown. Display 300 can also include navigation control options to change the information displayed to the user, and to allow the user to enter test parameters. One or more rows of tabs 314 can be presented to allow the user to select options to view and enter information for various categories of information, such as datapath control; advanced features; and test parameters shown.

In the embodiment shown, when one of tabs 314 is selected, a corresponding display is typically presented in the foreground, while the unselected tabs are displayed in the background. Other methods for navigating through various displays, such as pull-down menus, associated with the operator interface 116 can be implemented in addition to, or instead of, the tabs 314. Additional options can be presented to allow the user to initialize a series of tests to be run automatically, and to vary test parameters one at a time or in various combinations.

Options for starting, stopping, and pausing a test can also be provided on the display 300, as shown for example in another option row 322. A selection indicator such as a highlight box 324 around an option can be implemented to indicate the option selected. Display 300 can also include features that allow the user to configure values, flush displayed values, apply displayed values, close display 300, cancel test runs, and edit test parameters entered in the display 300. A test state indicator 326 can be included to indicate the status of the current test, such as "Executing", "Paused", and "Stopped".

Figure 3:
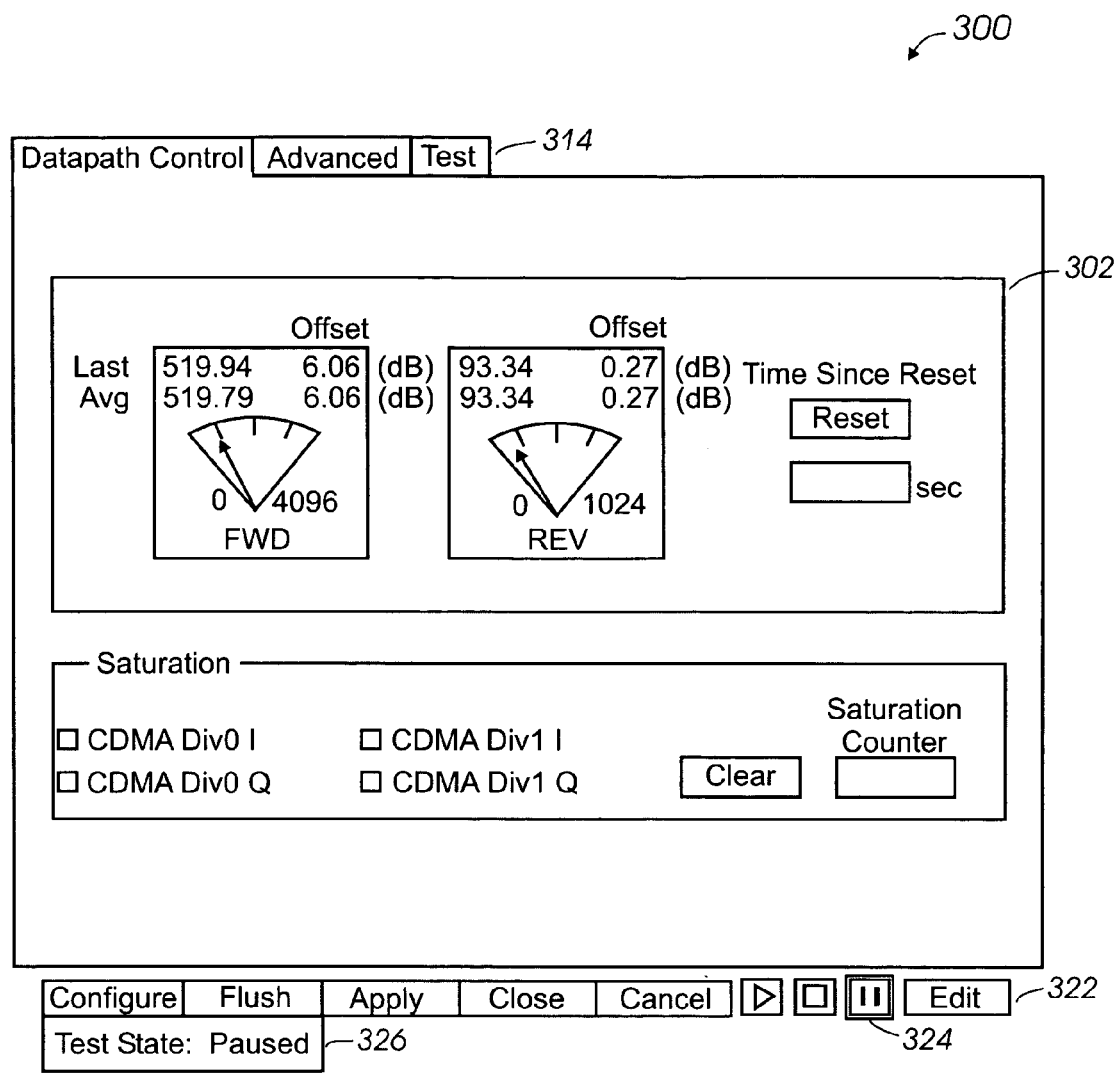
FIG. 3 is a representation of an embodiment of an operator interface display for initializing test parameters for the test system shown in FIG. 1.

FIG. 3 also shows an embodiment of a RF power meter 302 that is presented on display 300 when the DATAPATH CONTROL tab is selected from among the tabs 314. Power meter 302 can present the forward signal power (FWD) at the input of the sigma-delta analog to digital converter (ADC) 220. The power meter 302 can also be configured with a reverse power meter (REV) to show the power of the signals being transmitted from the MSM 106 to the cell station modem 117. In some embodiments of RF receiver 210, a nominal channel gain setting of approximately 0.0134 volts for test system 100, and a Vref of 600 millivolts in the MSM 106, results in the input signal to the MSM 106 of 0.0134 volts, and 0 dB gain in the DVGA 228. If this setting is violated, the power meter reading will deviate from a fixed dB value. The RF receiver model 104 can be configured to generate the I/Q signals at substantially the same power levels as the RF receiver 210.

The power meter 302 can also display the average value and the standard deviation of the RF power signal. The scale can be configured to show any suitable range of values including the decimal number represented by a specified number of bits. For example, the 0 dB point in test system 100 that corresponds to the 0 dB point in the RF receiver 210 can occur at $(13.4E-3/600E-3)*8192*sqrt(2)=258.73$. The square root of 2 factor is based on using the I/Q signals. An elapsed time for the test can be presented, as well as an option to reset the timer during a particular test.

The power meter 302 can also include information regarding antenna diversity and saturation. The embodiment shown allows the user to select an option to display saturation information for the I and Q signals for two different antenna diversities (shown as DIV0 and DIV1). A saturation counter displays the number of times that the amplifier 212 reached saturation since the counter was last cleared (by selecting the CLEAR option shown).

Figure 4:
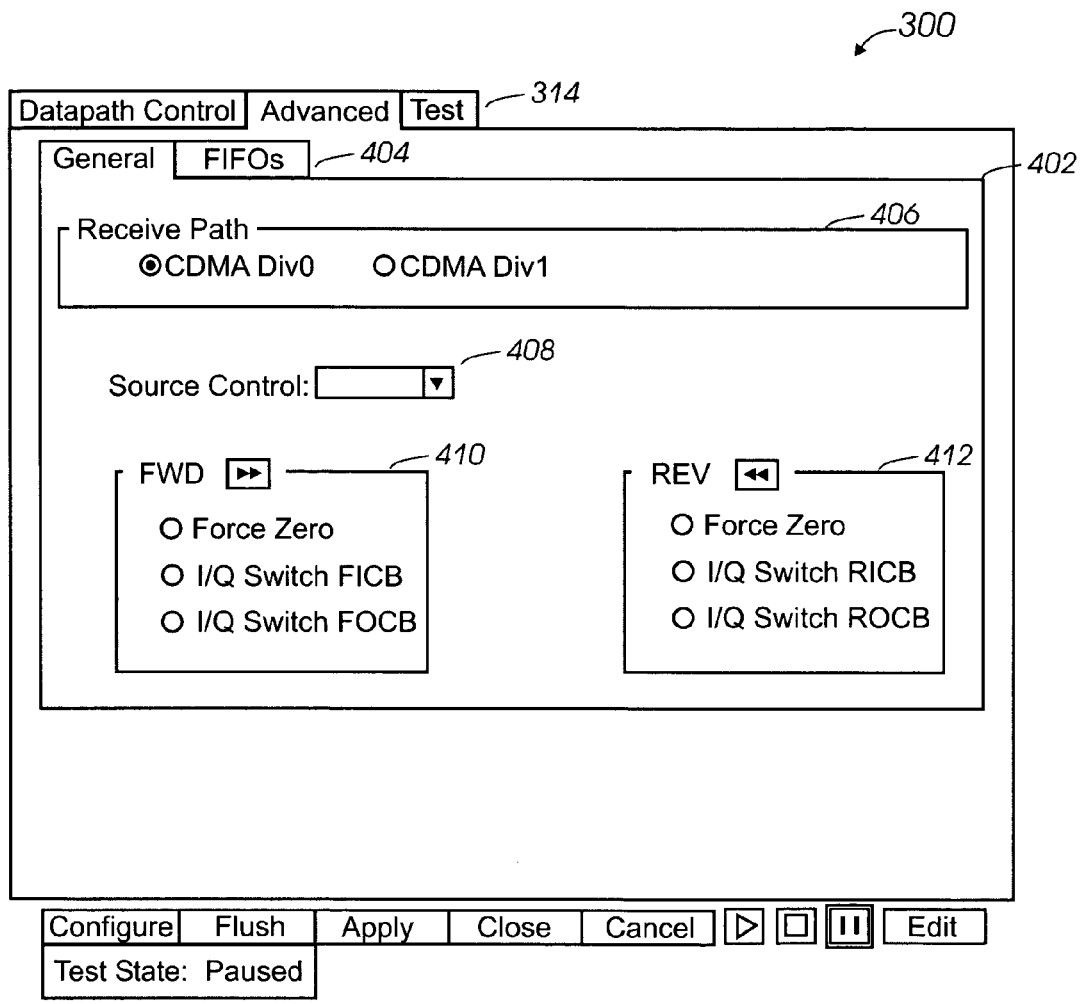
FIG. 4 is a representation of another embodiment of an operator interface display for initializing test parameters for the test system shown in FIG. 1.

Referring now to FIGS. 1 and 4, FIG. 4 shows an embodiment of an advanced display 402 that can be generated by the operator interface 116 when the ADVANCED tab is selected. Notice that an additional row of tabs 404 can be displayed with the ADVANCED tab selected to allow the user to select options to display information pertaining to other pertinent test parameters. In the embodiment shown, options for tabs 404 include general information, first in/first out (FIFO) signal information, and source files for test data.

With the GENERAL tab selected, the advanced display 402 allows the user to specify the zero interface (ZIF) receiver signal path to be tested based on antenna diversity options (DIV0, DIV1) in option area 406. The source control for signal input in the forward (receive) and reverse (transmit) directions can be selected via a pull-down menu 408 when an option from FWD option area 410 or REV option area 412 is selected. The options shown in area 410 includes forcing the forward input to zero, inputting the signal at the start of the receive signal path (Forward Input Control Block), and at the end of the receive signal path (Forward Output Control Block). The options shown in area 412 includes forcing the reverse input to zero, inputting the signal at the start of the transmit signal path (Reverse Input Control Block), and at the end of the transmit signal path (Reverse Output Control Block).

With the FIFO tab selected, the advanced display 402 allows the user to specify the zero interface (ZIF) receiver signal path to be tested based on antenna diversity options (DIV0, DIV1) in option area 406. The source control for signal input in the forward (receive) and reverse (transmit) directions can be selected via a pull-down menu 408 when an option from FWD option area 410 or REV option area 412 is selected. The options shown in area 410 includes forcing the forward input to zero, inputting the signal at the start of the receive signal path (Forward Input Control Block), and inputting the signal at the end of the receive signal path (Forward Output Control Block). The options shown in area 412 include forcing the reverse input to zero, inputting the signal at the start of the transmit signal path (Reverse Input Control Block), and at the end of the transmit signal path (Reverse Output Control Block).

Figure 5:
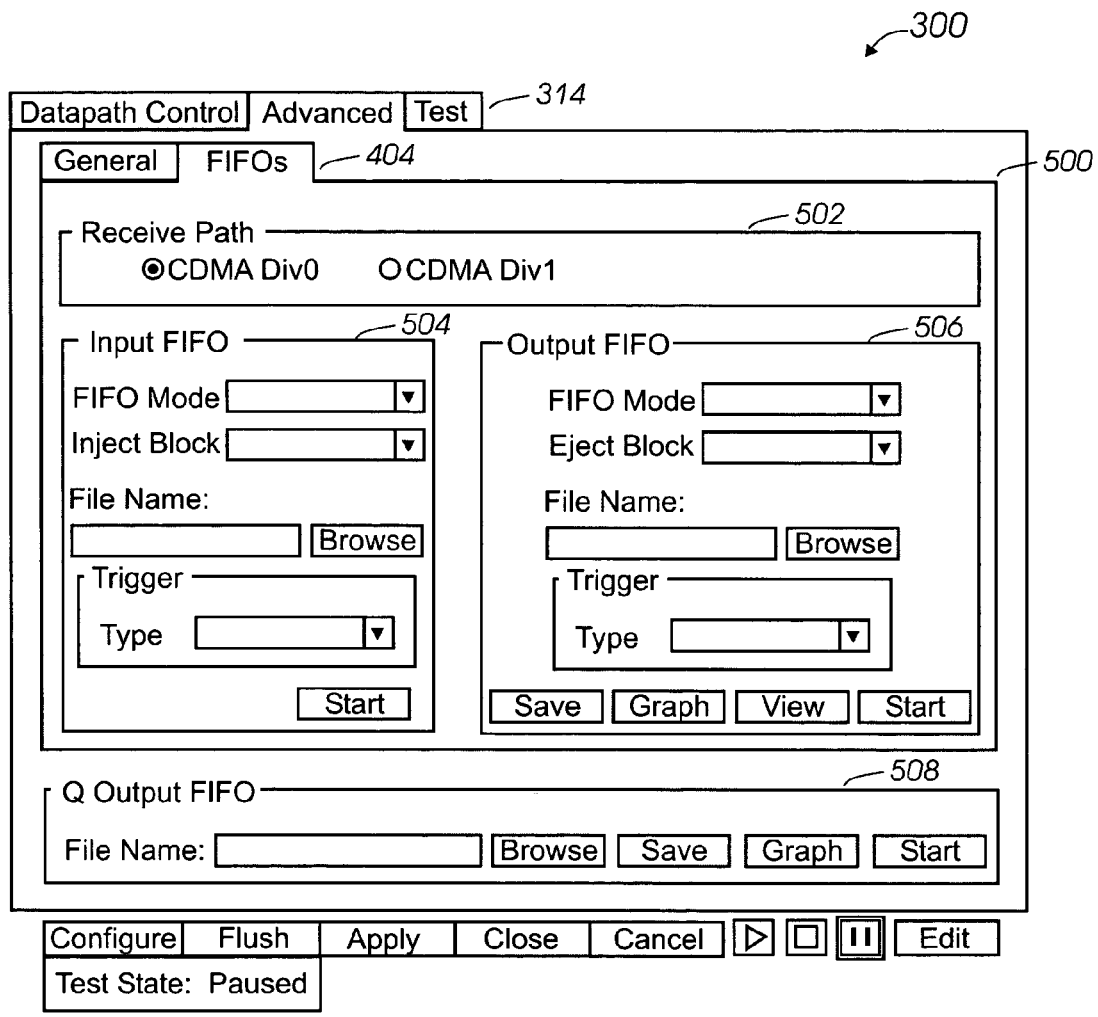
FIG. 5 is a representation of another embodiment of an operator interface display for initializing test parameters for the test system shown in FIG. 1.

Referring now to FIGS. 1 and 5, FIG. 5 shows an embodiment of a FIFO display 500 that can be generated by the operator interface 116 when the FIFO tab is selected from the advanced display 400 (FIG. 4). The FIFO display 500 allows the user to specify the forward receive diversity path to be tested based on antenna diversity options (DIV0, DIV1) in option area 502. The FIFO display 500 can include input FIFO option area 504 and output FIFO option area 506 that allow the user to specify FIFO mode, signal inject and eject locations in the receive signal path, file names that include that data injected or ejected, and a trigger type. The user can select one or more files that provide signal input at the specified location from the specified file name. The signal input can also be queued to a trigger, such as the beginning of the test. The output FIFO modes allow the user to record, graph, and view signals at various locations in the receive chain.

The input FIFO modes can include, for example, Forward Input Control Block (FICB), Jammer, and Forward Output Control Block (FOCB), which correspond to the beginning, middle, and end of the receive signal path. The output FIFO modes can include, for example, Forward Input Control Block (FICB), after AGC corrections are applied, before filtering, after filtering, before analog to digital conversion, after analog to digital conversion, and after the Forward Output Control Block (FOCB). FIFO mode, inject/eject blocks, file names, and other selections can be made via any suitable option select mechanism, such as the pull-down menus and fillable data entry areas shown in option areas 504 and 506. When the receiver signal path generates I/Q signals, FIFO display 500 can also include an option area 508 to allow the user to specify a filename to record and/or graph Q signal values corresponding to the I values being monitored via the option area 506.

Figure 6:
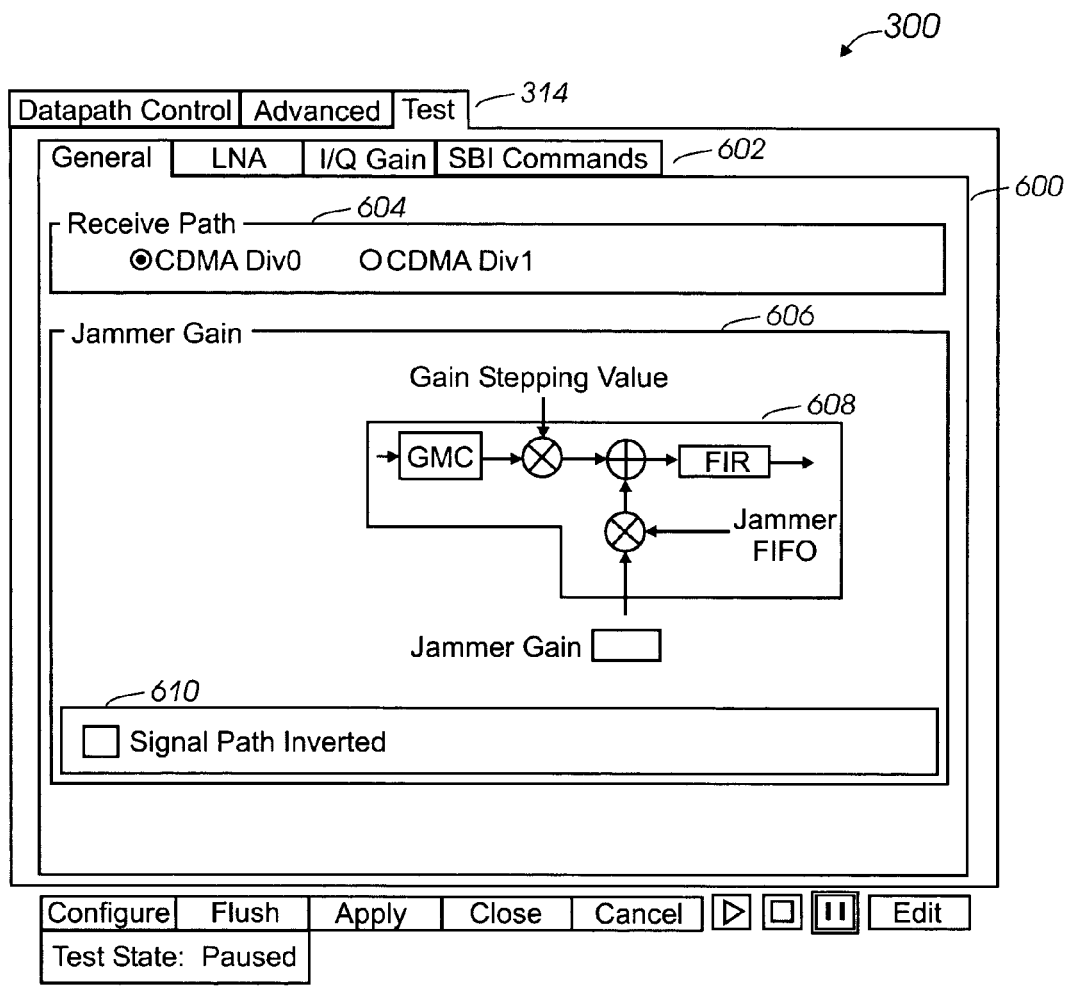
FIG. 6 is a representation of another embodiment of an operator interface display for initializing test parameters for the test system shown in FIG. 1.

Referring now to FIGS. 1, 2, and 6, FIG. 6 shows an embodiment of a general display 600 that is presented on the display 300 when the TEST tab is selected. Notice that one or more additional rows of tabs can be displayed for additional navigation control when a particular one of tabs 314 is selected. For example, in the embodiment shown with the TEST tab selected, an additional row of tabs 602 is presented in the display 300. Information pertaining to other pertinent test parameters can be displayed depending on which of tabs 602 is selected. In the embodiment shown, options for tabs 602 include selections to display information related to general information, the amplifier (LNA), I/Q gain, and SBI commands. The GENERAL display 600 can include options that allow the user to specify various parameters, such as, for example, receive path antenna diversity (option 604) and jammer gain (option 606). A block diagram 608 of the portion of the receive signal path where a value for jammer gain can be entered can be shown on the general display 600. The general display 600 can also include an option 610 to invert the signal paths of the I and Q signals for test purposes.

Figure 7:
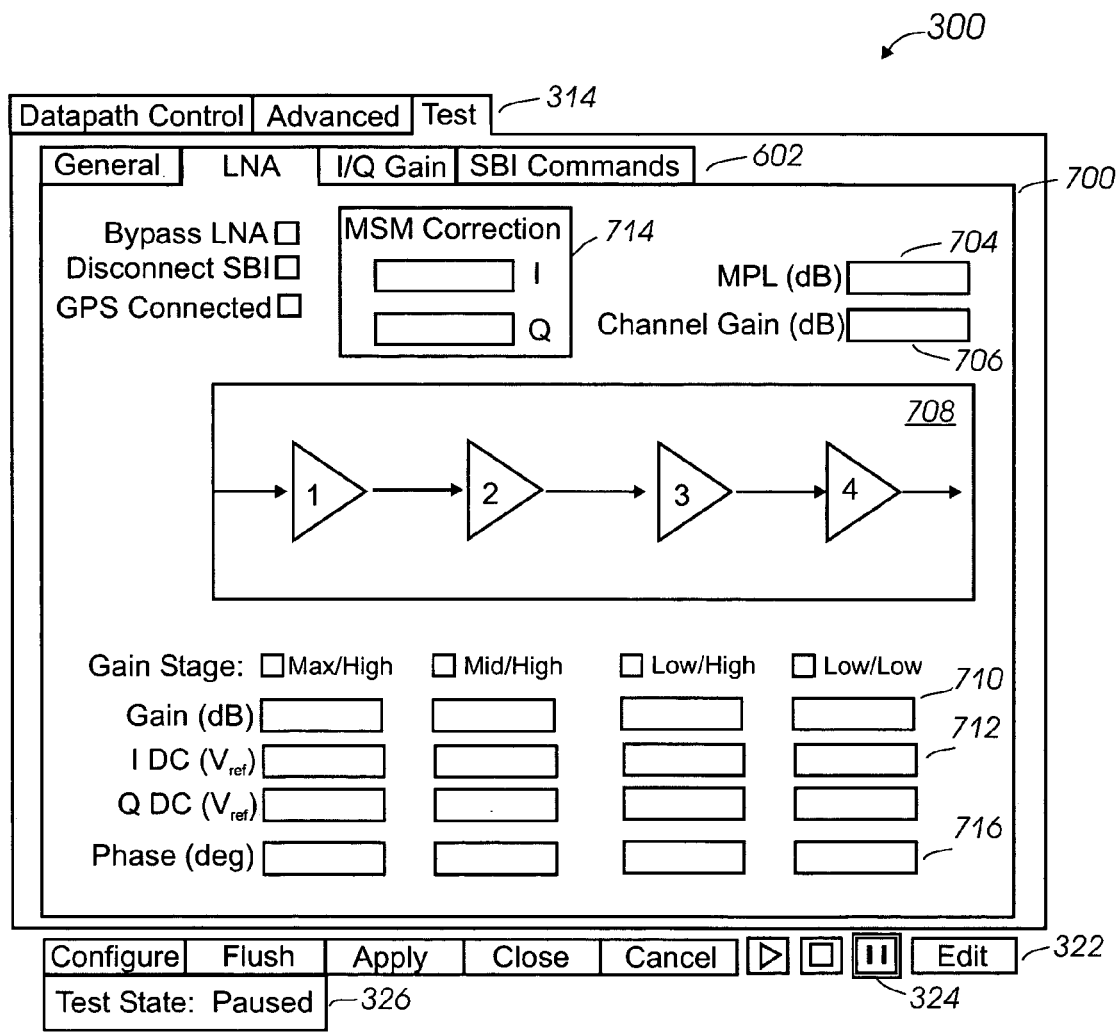
FIG. 7 is a representation of another embodiment of an operator interface display for initializing test parameters for the test system shown in FIG. 1.

Referring now to FIGS. 1, 2, and 7, FIG. 7 shows an embodiment of a low noise amplifier (LNA) display 700 generated on the display 300 when the LNA tab is selected from tab row 602. The LNA display 700 can present information pertaining to the amplifier 212, such as, for example, MPL, channel gain, and amplifier gain, phase shift, and I/Q signal levels. The embodiment of the LNA display 700 shown includes data entry areas 704, 706 allow the user to enter values for mean path loss (MPL) and channel gain, respectively. MPL is the loss in signal strength that simulates the distance from the transmitter (e.g. transmitter 202 as shown in FIG. 2). A nominal value for the channel gain, which represents the gain of the test system 100, can be specified. The channel gain is subtracted from the MPL, therefore any offset from the nominal channel gain will generate a corresponding offset to the RF power with respect to the MPL.

The channel gain and MPL can also be set to specific values to calibrate the test system 100. For example, the test system 100 can be calibrated to determine the power level at which the DVGA 228 in the MSM 106 has 0 dB gain at the input to the antenna 204 with all stages of the amplifier 212 switched on. For example, a mean path loss of approximately 66.3 dB corresponds to an RF power of about −97 dBm in some embodiments of the RF receiver 210. The channel gain and mean path loss can be set to yield 0 dB of RF power, which corresponds to a mean path loss related to the RF signal that yields 0 dB at the DVGA 228. The calibration can be normalized around different operating points, as required.

The MSM 106 sends various types of control signals, for example, gain stage control, frequency offset control, and DC offset control signals, to correct noise and distortions in the input signals. An RF signal can be affected by various sources of noise and distortion that interact with one another in a non-linear manner, thereby increasing the difficulty of developing the control logic for the MSM 106. Accordingly, the LNA display 700 can include options to selectively introduce noise, distortions, and dynamic corrections, to reduce nonlinearities and interactions. For example, the LNA display 700 can include an option to bypass the amplifier 212 and/or to disconnect the SBI circuit 226 (FIG. 2). When the option to bypass the amplifier 212 is selected, the test system 100 (FIG. 1) ignores gain stage control signal from the MSM 106 and uses the information in data entry areas 704, 706, and 710 to correct the mean path loss and channel gain values entered in data entry areas 704 and 706, respectively. Bypassing the gain stage control information from the MSM 106 allows the user to set the gain stage settings to constant values, thereby eliminating nonlinearities caused by introducing multiple dynamic corrections to the RF signal.

The gain of the amplifier 212 may be adjusted depending on the power of received RF signals. As the signal power increases, the gain of the amplifier 212 may be decreased continuously or in steps. In some embodiments, the amplifier 212 has five states, namely, a maximum/high gain, mid/high gain, low/high gain, and low/low gain, and a bypass state. The gain of the amplifier 212 can be stepped down at certain signal levels as the signal power increases to enable the RF receiver 210 to meet the interference requirements of various modes without degrading the sensitivity of the RF receiver 210. Gain stepping may also increase the available dynamic range and improve the performance of the RF receiver 210.

Gain values for multiple stages of a low noise amplifier can also be entered in the test system 100 via the LNA display 700. The embodiment of the LNA display 700 shown includes a schematic diagram 708 of a multi-stage low noise amplifier with corresponding data entry areas 710 that allow the user to enter values for the gain at each stage of the amplifier. In the example shown, the amplifier gain represents the cumulative gain value in decibels when a particular stage is selected. Stage 1 represents all amplifiers switched on; Stage 2 represents amplifiers 2, 3, and 4 switched on; Stage 3 represents amplifiers 3 and 4 switched on; and Stage 4 represents amplifier 4 switched on. The DC offset error generated at each amplifier stage can be entered in data entry areas 712 to test the algorithms for the DC offset canceller 224 in the MSM 106. Note that the DC offset error can be entered in terms of I and Q signals, and referenced to a particular value, such as the reference voltage (Vref) of the MSM 106.

When the option to disconnect the SBI circuit 226 is selected, correction values for the I and Q signals can be entered in data entry areas 712 to replace the gain stage and DC offset correction signals from the MSM 106 that would otherwise be used. In such a situation, the test system 100 ignores the dynamic correction signals transmitted to the RF receiver model 104 from the MSM 106 via the SBI circuit 226. When the disconnect SBI option is not selected, the values of the correction signals sent from the MSM 106 can be displayed in data entry areas 712. The phase shift that corresponds to the frequency offset error can be displayed, as shown in display areas 714.

The units for the values to be entered, such as decibels, degrees, and units of reference voltage (Vref), can be presented on display 300 to facilitate use of test system 100. The correction values can be entered directly in terms of the I and Q signals. Other suitable units can be utilized.

Figure 8:
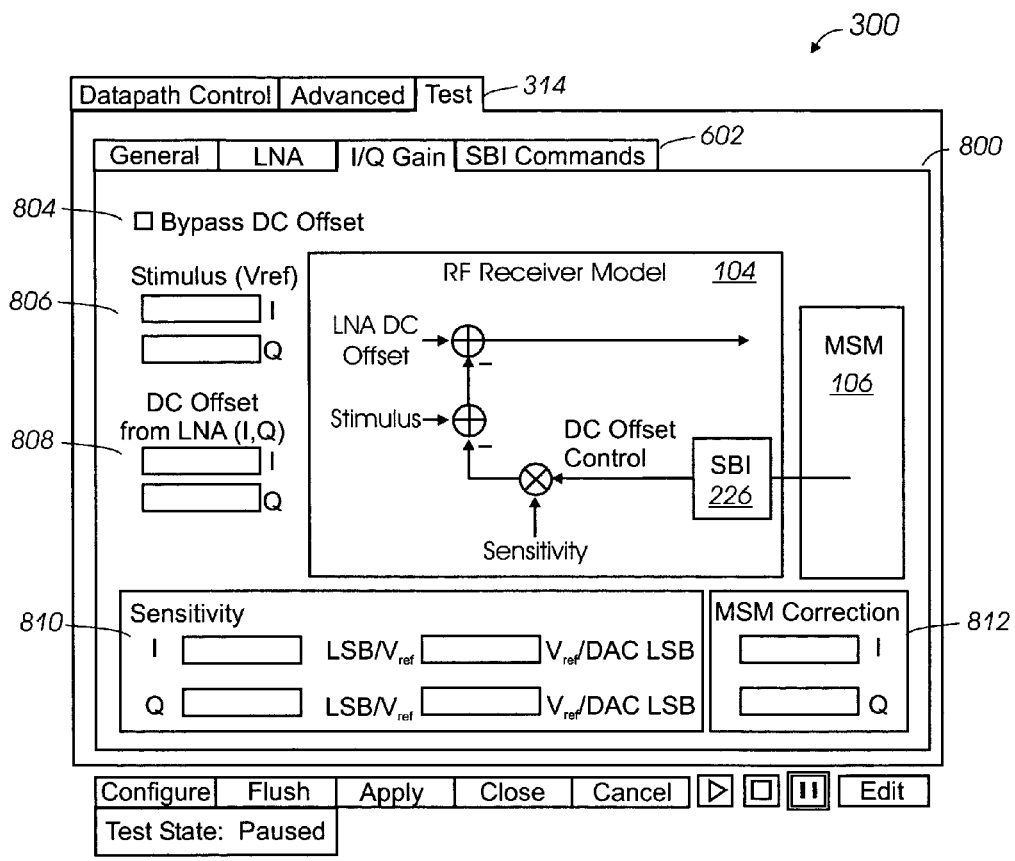
FIG. 8 is a representation of another embodiment of an operator interface display for initializing test parameters for the test system shown in FIG. 1.

Referring now to FIGS. 1 and 8, FIG. 8 shows an embodiment of an I/Q gain display 802 that can be generated by the operator interface 116 to allow the user to specify parameters to test the response of the DC offset canceller 224 (FIG. 2). I/Q gain display 802 includes a selectable option 804 to bypass the DC offset control signal from the MSM 106. Bypassing the DC offset control signal from the MSM 106 allows the user to set the DC offset correction settings to constant values, thereby reducing nonlinearities and interactions caused by introducing multiple dynamic corrections to the input signal.

Data entry areas 806 allow the user to enter I/Q stimulus values to simulate DC offset errors. The DC offset control signal from MSM 106 is subtracted from the I/Q stimulus values. The stimulus values can be specified in units of Vref, or other suitable quantity, depending on the configuration of the test system 100.

The I/Q values for DC offset generated by the amplifier 212 can be displayed in data areas 808. When the bypass LNA option is selected on the display 700 (FIG. 7), data entry areas 808 can display the cumulative DC offset value entered by the user in data entry areas 712 (FIG. 7). In the embodiment shown, the DC offset values are displayed in units of Vref, and are based on the number of amplifier stages that are switched on.

The DC offset control signals from the MSM 106 can be converted from digital to analog signals and scaled by a sensitivity value. Sensitivity determines the ability of a receiver to detect a weak signal. In some embodiments, the scaled signals are in units of Vref, (for example, 0.5 corresponds to one-half of Vref). The sensitivity values can be set to correspond to the sensitivity of components in the MSM 106. Data entry areas 810 allow the user to specify the sensitivity parameter in terms of the least significant bit per unit of Vref, and the units of Vref per least significant bit of I-DAC and Q-DAC frequency offset control signals from the MSM 106. Thus, the test system 100 can accommodate various models of the MSM 106, which can use different granularities for the sensitivity parameter. The capability to specify data granularity can be extended to other parameters as required.

Data entry area 812 allows the user to enter fixed values for the DC offset control signals from the MSM 106 when the bypass DC offset option 804 is selected.

Figure 9:
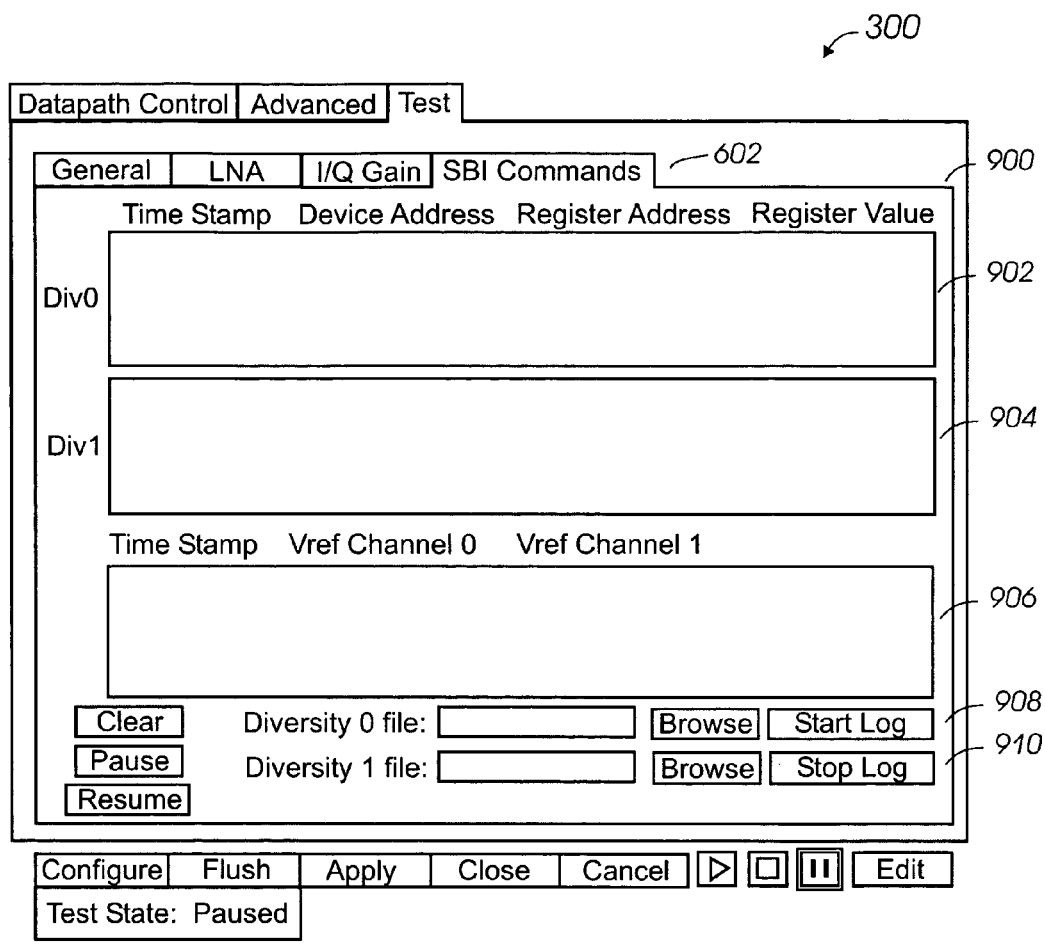
FIG. 9 is a representation of another embodiment of an operator interface display for initializing test parameters for the test system shown in FIG. 1.

Referring now to FIGS. 1 and 9, FIG. 9 shows an embodiment of an SBI commands display 900 that can be generated by the operator interface 116 to allow the user to monitor commands generated by the SBI circuit 226 (FIG. 2). In the embodiment shown, the user can view records of SBI commands for the DIV0 and DIV1 antenna diversity paths in corresponding display areas 902, 904. The record can include information such as a time stamp, the device address, register address, and register value, which corresponds to SBI commands generated by the SBI circuit 226. The reference voltages and corresponding time stamps for the diversity channels 0 and 1 can be presented in display area 906. The SBI commands display 900 can also include options to clear the display areas 902, 904, 906; and to pause or resume logging the SBI commands. The information can also be recorded in one or more files, as indicated by display areas 908, 910. Selectable options to start and stop the logs can also be included on the SBI commands display 900.

Figure 10:
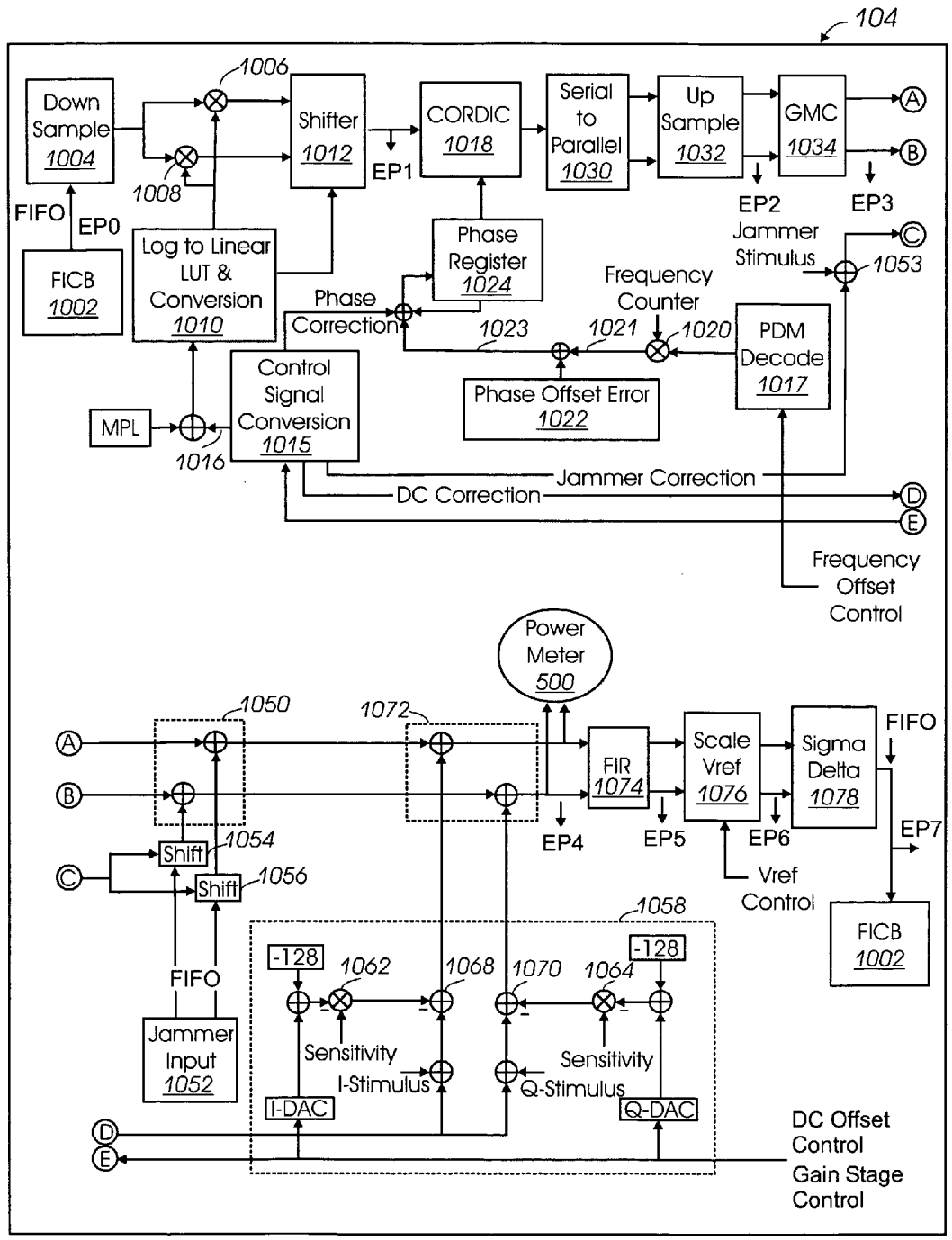
FIG. 10 is a block diagram of an embodiment of an RF receiver model for the test system shown in FIG. 1.

Referring now to FIGS. 1, 2, and 10, FIG. 10 shows further detail of an embodiment of the RF receiver model 104 for the test system 100. An input signal is provided from the channel model 102 to downsample circuit 1004. The input signal can be specified by the user via the operator interface 116, and adjusted manually as required, or an option can be selected via the operator interface 116 to automatically vary effects such as distortion and fading. The downsample circuit 1004 increases the sampling period of the input signal. In some embodiments, the sampling period is increased by a factor of three (3), however, other suitable downsampling factors can be utilized.

The downsampled signal is then combined with a signal that simulates mean path loss (MPL) introduced by the amplifier 212 and direct downconverter 218. The downsampled signal with the MPL component is converted to in-phase (I) and quadrature (Q) signal components in mixers 1006, 1008. The value for the MPL can be provided by the user via operator interface 116, for example, via data entry area 704 (FIG. 7). If the MPL value is entered in decibels, a log to linear lookup table and conversion circuit 1010 can be included to convert the MPL decibels to equivalent gain values. In some embodiments, the look-up table in conversion circuit 1010 performs a db-to-linear translation based on a formula, which may be expressed as:

$$Y(\text{linear}) = 10^{X/20}, \quad \text{Equation (1)}$$

where Y is the linear gain value from the look-up table and X is an attenuation value, which may be defined as:

$$X = -(Z(\text{dB}) + \text{offset}), \quad \text{Equation (2)}$$

where Z is the dB gain value provided to the look-up table and the offset in equation (2) may be used to compensate for truncation. Other techniques for converting dB gain value to linear gain value may be used. The linear gain value from conversion circuit 1010 is then clocked by shift register 1012 to align the timing of the gain value with that of the I/Q signals. The test system 100 may also be designed to operate based on linear (instead of dB) gain values, or other suitable values.

The MPL value applied to the I/Q signals typically decreases the strength of the input signal. Loss or gain due to signal processing by the test system 100, referred to as channel gain, can also be applied along with the MPL value. The channel gain can be specified by the user via the operator interface 116, for example, in data entry area 706 (FIG. 7).

In order to compensate for the effects of the MPL on the input signal, the control signal conversion circuit 1015 can convert the gain stage control signal from the AGC circuit 232 to an appropriate unit, for example, decibels, to form a gain stage correction signal 1016. The gain stage correction signal 1016 is combined with the MPL value and input to the log to linear conversion circuit 1010, which converts the combined MPL/gain stage correction signal to appropriate units for combining with the I/Q signals in mixers 1006, 1008. The resulting I/Q signals are input to respective shifter 1012.

Referring to FIG. 2, one source of frequency offset, referred to as Doppler shift, is due to relative motion between the transmitter 202 and the RF receiver 210. A local oscillator in the direct downconverter 218 provides a timing reference to downconvert the received signals. The local oscillator receives the frequency offset control signal from the MSM 106 and will increase the frequency according to the magnitude of a voltage of a certain polarity on the control signal, and decrease frequency according to the magnitude of a voltage of the opposite polarity on the control signal. The frequency control process aligns the timing reference of the RF receiver 210 with the received signals.

Referring again to FIGS. 1 and 10, in some embodiments, the I and Q components of the received signal can be rotated by the difference between a frequency offset error provided by the user and a frequency offset control signal from the MSM 106 to simulate the frequency control process in test system 100. The test system 100 can employ a pulse density modulator (PDM) decoder circuit 1017 to decode the frequency offset control signal from the MSM 106. The pulse density of the decoded frequency offset control signal can be determined by a frequency counter at mixer 1020 to form a phase offset correction signal 1021.

The output of the phase offset error circuit 1022 represents the frequency deviation of the local oscillator and can be provided by the user via the operator interface, for example, via data entry areas 716 on display 700 in FIG. 7. The difference between the phase offset correction signal 1021 and the output signal from the phase offset error circuit 1022 is determined to form a phase error signal 1023.

In some embodiments, the MSM 106 can be configured with inner loop and outer loop frequency control circuits. The frequency offset control signal may comprise the outer loop signal while an inner loop phase correction signal can be provided via the SBI circuit 226 and control signal conversion circuit 1015. The difference between the inner loop phase correction signal and phase error signal 1023 can be formed and provided to a phase register 1024.

The phase register 1024 determines the amount of frequency offset to apply to the I/Q signals based on the difference between the frequency offset error, and the phase correction and the frequency offset correction signals. The output signal from the phase register 1024 can be provided to a COordinate Rotation DIgital Computer (CORDIC) 1018, which rotates the phase of the I/Q signals. In some embodiments, the CORDIC 1018 implements an algorithm known in the art to efficiently rotate a vector (1, 0) through a series of rotations through smaller angles.

After the frequency offset correction is applied to the I/Q signals, a serial to parallel circuit 1030 converts the I/Q signals from a serial to a parallel data communication format. An up sample circuit 1032 decreases the sampling period of the I/Q signals. In some embodiments, the sampling period is decreased by a factor of three (4), however, other suitable upsampling factors can be utilized.

A low pass filter 1034, such as a transconductance-capacitance (GmC) 5th order elliptic Infinite Impulse Response (IIR) filter, can be included in the RF receiver model 104 to help minimize inter-carrier interference and overall phase non-linearity, and to match the transmitter's pulse shaping to maximize the signal-to-noise ratio (SNR). The low pass filter 1034 can be configured to emulate the performance of at least a portion of the receive filter 214 in the RF receiver 210. Other types of filters can be used in addition to, or instead of, low pass filter 1034.

The I/Q signals output by the low pass filter 1034 are provided to a summing junction 1050 in which jammer signals introduced by the user for test purposes may be removed. Jammer leakage can occur when a jammer signal leaks to the input of the local oscillator or the output of other devices within the RF receiver 210. Such leakage may mix with the jammer signal to produce undesired signals, such as DC signal levels that are proportional to the amplitude modulation (AM) component of the jammer signal. AM jammer signals may be located at any frequency within a receive frequency band. For test purposes, the RF receiver model 104 and the operator interface 116 can be configured to allow the user to specify a jammer input signal 1052 and a jammer stimulus value. A jammer control signal transmitted from the MSM 106 via the SBI circuit 226 can be converted to appropriate units, such as units of Vref, in control signal conversion circuit 1015 to form a jammer correction signal. The jammer correction signal can be added to the stimulus value at summing junction 1053. The output of the summing junction 1053 can be provided to shift registers 1054, 1056 to reduce interference from the jammer input signal 1052. The shifted jammer signal is then added to the I/Q signals in the summing junction 1050.

In the embodiment shown, a DC offset circuit 1058 receives the I/Q signals output of the jammer summing junction 1050 and applies one or more DC offset control signals provided by the DC offset canceller circuit 224 to the I/Q signals. The I/Q DC control signals (I-DAC and Q-DAC) from the DC offset canceller 224 can be converted to 2's complement format, as required, by subtracting an appropriate value that is based on the number of bits used to represent the signals. In the example shown, a value of ($2^8$), or 128, is subtracted from the I-DAC and Q-DAC signals to form the two's complement as represented with 8 bits. The two's complement value of the respective I-DAC and Q-DAC signals can be multiplied at mixers 1062, 1064 by a sensitivity factor that may also be specified by the user, via the operator interface 116, for example.

In some embodiments, the DC offset canceller 224 implements more than one DC offset correction loops that attempt to remove DC offsets at different locations in the input signal path of the RF receiver 210. Thus, in addition to the I-DAC and Q-DAC signals, which are used to remove DC offset at one point in the received signal path, other DC offset control signals can be provided to remove the DC offset at another point along the input signal path. The test system 100 can be configured to accommodate as many different DC offset control signals from the MSM 106 as required. In the embodiment shown, DC offset control signals from the SBI circuit 226 are also provided to the control signal conversion circuit 1015, which generates a corresponding DC correction signal. An I-stimulus and a Q-stimulus signal, as specified by the user via the display 800 (FIG. 8), for example, can be added to the DC offset correction signal at respective summing junctions 1068, 1070. The output of the summing junctions 1068, 1070 can be combined with the I/Q signals in another summing junction circuit 1072 to form compensated I/Q signals.

The power meter 302 can be configured to monitor the I/Q signals at any suitable point in the test system 100. In the embodiment shown, the power meter 302 (FIG. 3) is coupled to measure the power of the compensated I/Q signals after all of the gain stage, jammer, and DC offset corrections have been applied.

To simulate the remaining I/Q signal processing that can be performed by the RF receiver 210, the I/Q signals can be filtered to remove unwanted components of the I/Q signals. In some embodiments, a Finite Impulse Response (FIR) filter 1074 can be implemented to avoid adding phase or delay distortion to the signals. Other suitable filters can be utilized, in addition to, or instead of, the FIR filter 1074.

The output of the FIR filter 1074 can be provided to Vref scale circuit 1076, which scales the I/Q signals to the voltage level being used in the MSM 106. The sigma-delta analog to digital converter (ADC) 220 has a linear range based on the value of Vref. In some situations, the MSM 106 increases Vref to increase the dynamic range signals that can be handled by the wireless communication device 200. For example, in some embodiments, the nominal value of Vref can be increased by a factor of square root of two at certain times to increase dynamic range. Other scale factors can be utilized. The value of Vref can be returned to the nominal value to avoid unnecessary power consumption when the increased dynamic range is not required. The MSM 106 can output a Vref control signal that is provided to the Vref scale circuit 1076 to control whether the I/Q signals should be scaled to the nominal Vref value before being input to the sigma-delta ADC 220.

The test system 100 can implement a digital sigma-delta circuit 1078 to simulate the sigma-delta ADC 220 in the RF receiver 210. In some embodiments, the digital sigma-delta circuit 1078 employs fourth order noise shaping, however, other suitable topologies can be utilized. The output signals of the sigma-delta circuit 1078, shown for example as Y1, Y2, YQ1, YQ2, are provided to the MSM 106 for further processing.

The test system 100 allows designers to test the ability of the MSM 106 to compensate noise and distortions that can be introduced at various locations in the RF receiver 210, as well as external to the RF receiver 210. For each distortion, the feedback loops from the MSM 106 can be closed collectively and/or individually to analyze the ability of MSM 106 to compensate the noise and distortion in the input signal. Further, the number of bits used to represent the control signals from the MSM 106, also referred to as data granularity, can be specified via the operator. For example, display 402 allows the user to specify the sensitivity parameter in terms of the least significant bit per unit of Vref, and the units of Vref per least significant bit of the I-DAC and Q-DAC values. The test system 100 can be configured to simulate any type of device that processes RF analog signals.

The test system 100 can be configured to receive additional control signals from the MSM 106, as well as allow the user to input corresponding distortions and vary appropriate test parameters. In further embodiments, test system 100 can be configured to allow the user to vary parameters in the MSM 106 as well as in the RF receiver model 104. Corresponding displays and controls can be provided in the operator interface 116 to support additional testing capabilities. Test parameters can also be entered via means in addition to the operator interface 116, such as from a database or data file that is accessible by the test system 100, for example. Signals in the receiver path can be monitored at one or more eject points, shown as EP1 through EP7 in FIG. 10.

Logic instructions can be stored on a computer readable medium, or accessed in the form of electronic signals. The logic modules, processing systems, and circuitry described herein may be implemented using any suitable combination of hardware, software, and/or firmware, such as Field Programmable Gate Arrays (FPGAs), Application Specific Integrated Circuit (ASICs), or other suitable devices. The logic modules can be independently implemented or included in one of the other system components. Similarly, other components are disclosed herein as separate and discrete components. These components may, however, be combined to form larger or different software modules, logic modules, integrated circuits, or electrical assemblies, if desired.

It is to be understood that the figures and descriptions of the present invention have been simplified to illustrate elements that are relevant for a clear understanding of the present invention, while eliminating, for purposes of clarity, many other elements found in a typical mobile communication device. Those of ordinary skill in the art will recognize that other elements are desirable and/or required in order to implement the present invention. However, because such elements are well known in the art, and because they do not facilitate a better understanding of the present invention, a discussion of such elements is not provided herein.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. The functionality and combinations of functionality of the individual modules can be any appropriate functionality. In the claims, unless otherwise indicated the article "a" is to refer to "one or more than one".

We claim:

1. A system for testing a mobile station modem (MSM), comprising:
    a radio frequency (RF) receiver model configured to emulate signal processing functions of a RF receiver, to add distortion and noise to create adjusted signals, and to output the adjusted signals to the MSM, wherein the RF receiver model is operable to:
    receive input signals representing radio frequency (RF) signals;
    receive test parameters from an operator interface;
    adjust the input signals to add distortion and noise to create the adjusted signals based on the test parameters received from the operator interface;
    receive control signals from the MSM to remove DC offset errors;
    amplify the adjusted signals with a gain controlled by the control signals received from the MSM to create amplified signals; and
    output the amplified signals to the MSM.

2. The system of claim 1, further comprising:
    a channel model capable to communicate the input signals to the RF receiver model, wherein the channel model is operable to include noise and distortion effects in the RF signals.

3. The system of claim 1, further comprising:
    the operator interface, wherein the operator interface is capable to receive error signals input by a user, and to transmit the error signals to the RF receiver model.

4. The system of claim 3, wherein the operator interface includes a selectable option to bypass at least one of the control signals.

5. The system of claim 1, wherein the test parameters include at least one of the group of:
    direct current (DC) offset for at least one amplifier stage;
    frequency offset for at least one amplifier stage; or
    mean path loss due to signal fading.

6. The system of claim 1, wherein at least a portion of the test parameters are specified in the operator interface as in-phase (I) and quadrature (Q) signals.

7. The system of claim 1, wherein at least a portion of the test parameters are specified as a percentage of a reference voltage for the MSM.

8. The system of claim 1, wherein the test parameters are communicated to the RF receiver model via a serial bus interface.

9. The system of claim 8, wherein the operator interface includes a selectable option to bypass the serial bus interface.

10. The system of claim 1, wherein the operator interface is configured to indicate the strength of the adjusted signals.

11. A system for testing a communication device, wherein the communication device includes an analog signal processing portion and a mobile station modem (MSM) operable to generate control signals for the analog signal processing portion, the system comprising:
    a radio frequency (RF) receiver model to emulate signal processing functions of a RF receiver, to add distortion and noise to received signals to create adjusted signals, and to output the adjusted signals to the MSM, the RF receiver model including:
    receiver components that emulate the analog signal processing portion including:
        distortion components to add distortion and noise to create the adjusted signals based on test parameters received from an operator interface, and
        amplifier components configured to amplify the adjusted signals with a gain controlled by control signals received from the MSM to remove DC offset errors.

12. The system of claim 11, wherein the distortion includes direct current (DC) offset for at least one amplifier stage.

13. The system of claim 11, wherein the distortion includes frequency offset.

14. The system of claim 11, wherein the distortion includes mean path loss due to signal fading.

15. The system of claim 11, wherein the RF receiver model emulates a direct down conversion receiver.

16. The system of claim 11, further comprising an operator interface that allows a user to enter test parameters and to select an option to bypass at least one of the control signals.

17. The system of claim 11, wherein the system is configured to indicate the strength of the input signal after at least one of the adjusted error signals has been applied.

18. The system of claim 11, wherein the system is configured to allow the user to specify the sensitivity of at least one of the control signals.

19. The system of claim 11, wherein at least one of the receiver components includes a sigma-delta circuit and at least one of the signal compensation components is configured to scale the input signal to the sigma-delta circuit based on the value of $V_{ref}$ at the mobile station modem.

20. The system of claim 11, wherein at least one of the receiver components includes a mixer operable to convert the input signal to corresponding in-phase and quadrature signals (I/Q signals).

21. The system of claim 11, wherein the distortion includes a jammer signal.

22. The system of claim 21, further comprising a COordinate Rotation DIgital Computer (CORDIC) operable to rotate the phase of the I/Q signals based on a frequency offset distortion signal and a frequency offset control signal.

23. The system of claim 11, further comprising a mixer operable to adjust the input signal by at least one amplifier gain factor.

24. The system of claim 11, further comprising a control signal conversion circuit operable to convert the control signals to a corresponding correction signal to remove at least a portion of the distortion from the input signal.

25. The system of claim 11, further comprising a conversion circuit operable to convert the distortion signals from non-linear units to linear units.

26. A method for testing signal processing and control operations in a communication device, wherein the communication device includes an analog signal processing portion and a digital baseband processing portion, the method comprising:
   receiving signal distortion parameters by a radio frequency (RF) receiver model configured to emulate signal processing functions of a RF receiver;
   adding distortion and noise to an input signal received by the RF receiver model to produce an adjusted signal;
   receiving control signals by the RF receiver model from the baseband processing portion of the communication device to remove DC offset errors;
   amplifying the adjusted signal with an amplifier component of the RF receiver model using a gain controlled by the control signals received from the communication device to form a corrected input signal; and
   measuring a power of the input signal and the corrected input signal.

27. The method of claim 26, further comprising:
   applying the control signals to correct the distortion parameters in at least two different locations along the path of the input signal in the analog processing portion.

28. The method of claim 26, wherein the distortion parameters include at least one of:
   direct current (DC) offset for at least one amplifier stage;
   frequency offset;
   jammer interference; or
   mean path loss due to signal fading.

29. The method of claim 26, wherein the analog processing portion emulates a direct down conversion receiver.

30. The method of claim 26, further comprising selecting an option to bypass at least one of the control signals.

31. The method of claim 26, further comprising indicating the strength of the input signal after at least one of the correction signals has been applied to the input signal.

32. The method of claim 26, further comprising adjusting the sensitivity of the communication device.

33. The method of claim 26, further comprising scaling the input signal to a sigma-delta circuit based on the value of $V_{ref}$ at the digital baseband processing portion.

34. The method of claim 26, further comprising converting the input signal to corresponding in-phase and quadrature signals (I/Q signals).

35. The method of claim 34, further comprising rotating the phase of the I/Q signals based on a frequency offset distortion signal and a frequency offset control signal.

36. The method of claim 26, further comprising adjusting the input signal by at least one amplifier gain factor.

37. The method of claim 26, further comprising converting the distortion signals from non-linear units to linear units.

38. An apparatus for testing signal processing and control operations in a communication device, wherein the communication device includes an analog signal processing portion and a digital baseband processing portion, the apparatus comprising:
   means for receiving signal distortion parameters, wherein the means for receiving signal distortion parameters is part of a radio frequency (RF) receiver model configured to emulate signal processing functions of a RF receiver;
   means for adding distortion and noise to an input signal received by the RF receiver model to produce an adjusted signal;
   means for receiving control signals by the RF receiver model from the baseband processing portion of the communication device to remove DC offset errors;
   means for amplifying the adjusted signal with an amplifier component of the RF receiver model using a gain controlled by the control signals received from the communication device to form a corrected input signal; and
   means for measuring a power of the input signal and the corrected input signal.

39. The apparatus of claim 38, further comprising:
   means for applying the control signals to correct the distortion parameters in at least two different locations along the path of the input signal in the analog processing portion.

40. The apparatus of claim 38, wherein the distortion parameters include at least one of:
   direct current (DC) offset for at least one amplifier stage;
   frequency offset;
   jammer interference; or
   mean path loss due to signal fading.

41. The apparatus of claim 38, wherein the analog processing portion emulates a direct down conversion receiver.

42. The apparatus of claim 38, further comprising means for bypassing at least one of the control signals to determine the effect of the control signal on the input signal.

43. The apparatus of claim 38, further comprising means for indicating the strength of the input signal after at least one of the correction signals has been applied to the input signal.

44. The apparatus of claim 38, further comprising means for adjusting the sensitivity of the communication device.

45. The apparatus of claim 38, further comprising means for scaling the input signal to a sigma-delta circuit based on the value of $V_{ref}$ at the digital baseband processing portion.

46. The apparatus of claim 38, further comprising means for converting the input signal to corresponding in-phase and quadrature signals (I/Q signals).

47. The apparatus of claim 46, further comprising means for rotating the phase of the I/Q signals based on a frequency offset distortion signal and a frequency offset control signal.

48. The apparatus of claim 38, further comprising means for adjusting the input signal by at least one amplifier gain factor.

49. The apparatus of claim 38, wherein the distortion parameters are specified in terms of the baseband.

* * * * *